United States Patent
Assouline et al.

(10) Patent No.: US 12,177,600 B2
(45) Date of Patent: Dec. 24, 2024

(54) BACKGROUND REPLACEMENT USING NEURAL RADIANCE FIELD

(71) Applicant: Snap Inc., Santa Monica, CA (US)

(72) Inventors: Avihay Assouline, Tel Aviv (IL); Itamar Berger, Hod Hasharon (IL); Gal Dudovitch, Tel Aviv (IL); Ma'ayan Mishin Shuvi, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 204 days.

(21) Appl. No.: 17/852,919

(22) Filed: Jun. 29, 2022

(65) Prior Publication Data

US 2024/0007585 A1    Jan. 4, 2024

(51) Int. Cl.
| | |
|---|---|
| H04N 5/265 | (2006.01) |
| G06V 10/32 | (2022.01) |
| G06V 10/82 | (2022.01) |
| G06V 40/10 | (2022.01) |
| H04N 5/272 | (2006.01) |
| H04L 51/046 | (2022.01) |

(52) U.S. Cl.
CPC ............ *H04N 5/265* (2013.01); *G06V 10/32* (2022.01); *G06V 10/82* (2022.01); *G06V 40/10* (2022.01); *H04N 5/272* (2013.01); *H04L 51/046* (2013.01)

(58) Field of Classification Search
CPC ........ H04N 5/265; H04N 5/272; G06V 10/32; G06V 40/10; G06V 10/82; H05N 51/046
USPC ........................................................ 345/633
See application file for complete search history.

(56) References Cited

U.S. PATENT DOCUMENTS

| | | | |
|---|---|---|---|
| 2011/0242277 A1* | 10/2011 | Do ...................... | H04N 5/2226 |
| | | | 348/E13.064 |
| 2017/0124713 A1* | 5/2017 | Jurgenson ................ | G06T 7/20 |
| 2019/0082118 A1 | 3/2019 | Wang et al. | |
| 2020/0234451 A1* | 7/2020 | Holzer .................... | G06T 7/194 |
| 2021/0065440 A1* | 3/2021 | Sunkavalli ............... | G06N 3/08 |
| 2022/0286657 A1* | 9/2022 | Oz ........................ | H04N 7/157 |

(Continued)

FOREIGN PATENT DOCUMENTS

WO    WO-2024006275 A1    1/2024

OTHER PUBLICATIONS

Guo, Y., Chen, K., Liang, S., Liu, Y., Bao, H., Zhang, J.: AD-NeRF: audio driven neural radiance fields for talking head synthesis. In: ECCV (2021).*

(Continued)

*Primary Examiner* — Jin Ge
(74) *Attorney, Agent, or Firm* — Schwegman Lundberg & Woessner, P.A.

(57) ABSTRACT

Aspects of the present disclosure involve a system for providing virtual experiences. The system accesses an image depicting a person and one or more camera parameters representing a viewpoint associated with a camera used to capture the image. The system extracts a portion of the image comprising the depiction of the person. The system processes, by a neural radiance field (NeRF) machine learning model, the one or more camera parameters to render an estimated depiction of a scene from the viewpoint associated with the camera used to capture the image. The system combines the portion of the image comprising the depiction of the person with the estimated depiction of the scene to generate an output image and causes the output image to be presented on a client device.

20 Claims, 12 Drawing Sheets

(56) References Cited

U.S. PATENT DOCUMENTS

| | | | | |
|---|---|---|---|---|
| 2022/0292781 A1* | 9/2022 | Bautista Martin | ...... | G06T 15/55 |
| 2022/0301257 A1* | 9/2022 | Garbin | .................... | G06T 15/06 |
| 2022/0319055 A1* | 10/2022 | Zhang | .................... | G06T 7/251 |
| 2023/0037591 A1* | 2/2023 | Villegas | .................... | G06T 7/70 |

OTHER PUBLICATIONS

"International Application Serial No. PCT US2023 026341, International Search Report mailed Sep. 15, 2023", 5 pgs.
"International Application Serial No. PCT US2023 026341, Written Opinion mailed Sep. 15, 2023", 10 pgs.
Ayush, Tewari, "Advances in Neural Rendering", arxiv.org, Cornell University Library, 201 Olin Library Cornell University Ithaca, NY 14853, (Mar. 30, 2022), 1-33.
Mildenhall, Ben, "NeRF: Representing scenes as neural radiance fields for view synthesis", Communications of the ACM, Association for Computing Machinery, Inc, United States, vol. 65, No. 1, (Dec. 17, 2021), 99-106.
Pandey, Rohit, "Total relighting", ACM Transactions on Graphics, ACM, NY, US, vol. 40, No. 4, (Jul. 19, 2021), 1-21.
Xie, Christopher, "FIG-NeRF: Figure-Ground Neural Radiance Fields for 3D Object Category Modelling", ARXIV, ORG Cornell University Library, 201 Olin Library Cornell University, Ithaca, NY 14853, (Apr. 17, 2021), 12 pgs.

* cited by examiner

BACKGROUND REPLACEMENT USING NEURAL RADIANCE FIELD

TECHNICAL FIELD

The present disclosure relates generally to providing augmented reality (AR) experiences using a messaging application and particularly to providing background replacement using a Neural Radiance Field (NeRF) system.

BACKGROUND

Augmented Reality (AR) is a modification of a virtual environment. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
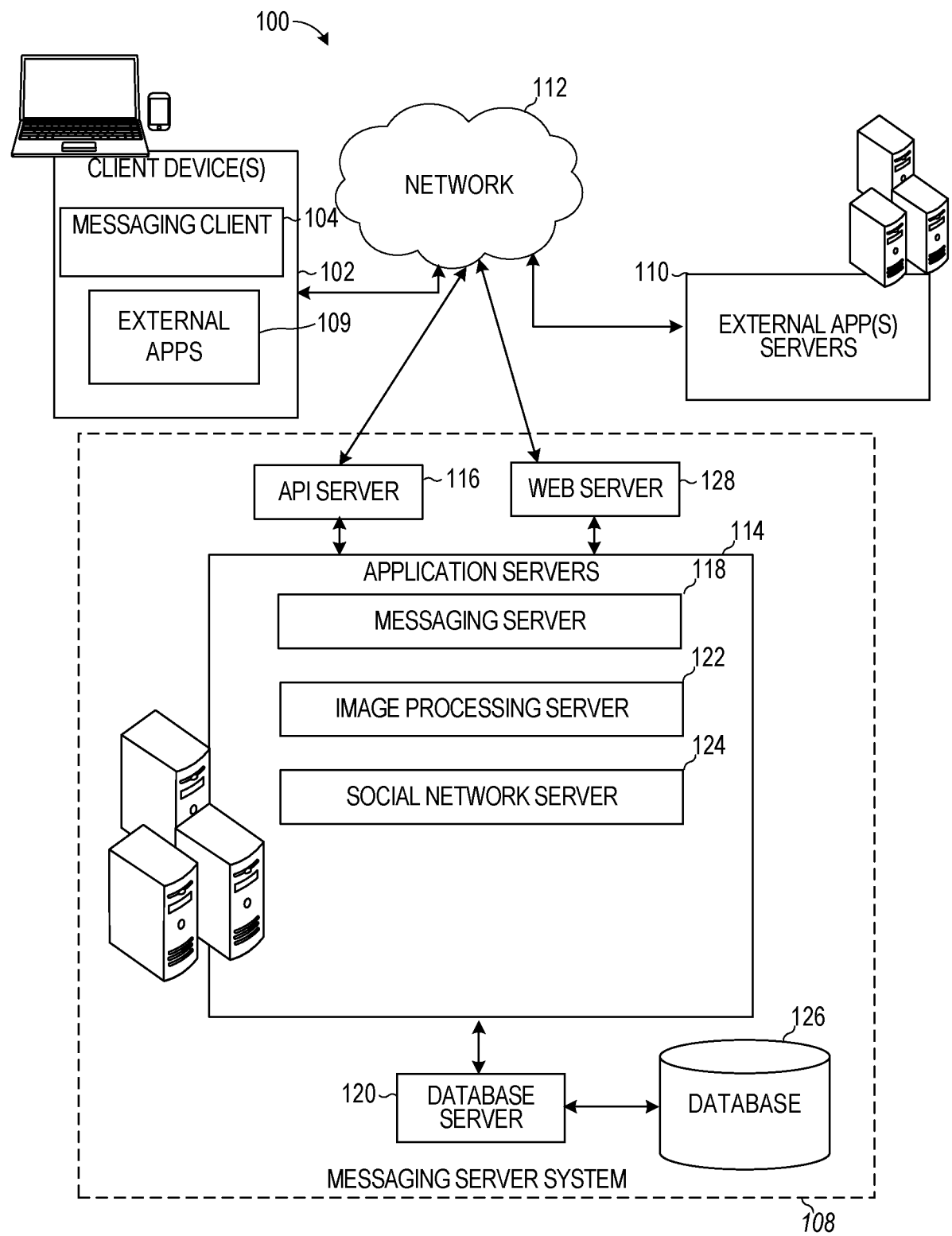
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems allow users to add AR elements to their environment (e.g., captured image data corresponding to a user's surroundings). Such systems can be used to replace a background in an image depicting a user with an alternate static or animated background. To do so, the typical AR/VR systems identity a background in an image received from a client device and replace pixels of that background with pixels of a desired background. While these systems generally work well, they start to break down when the camera used to capture an image of the user in the foreground changes. Namely, as the camera is moved around and a viewpoint of the user changes, the background remains statically displayed and is not updated. Also, because the background and the currently captured image are captured under different lighting conditions, the rendered image of the user with the different background looks unrealistic. This breaks the illusion that the background is actually part of the displayed image and reduces the overall effect of having the AR/VR system function properly.

In some cases, users spend time and effort traveling to specific locations to record videos with a desired scene. Namely, a user may desire to feature a product in a particular environment. To do so, the user has to travel to the specific location and spend time recording the video at that location. This extra effort needed to produce high quality content is often avoided which creates missed opportunities for users.

The disclosed techniques improve the efficiency of using an electronic device which implements or otherwise accesses an AR/VR system by intelligently and automatically generating an image with a new background or scene that takes into account lighting conditions. For example, the disclosed techniques allow a user to select a particular background or scene to render in place of a current scene depicted in a captured image or video. The disclosed techniques obtain camera parameters (e.g., height, rotation, accelerometer, and/or gyroscopic measurements) of the camera used to capture an image of a person. Using these camera parameters, the disclosed techniques render the background or scene, such as using a NeRF machine learning model, that depicts the background or scene as appearing from the same viewpoint as the camera used to capture the image of the person. The disclosed techniques extract the depiction of the person from the captured image and adjust lighting conditions of the extracted depiction of the person to match the lighting conditions of the background by using a relighting machine learning model. The extracted depiction of the person in which lighting was adjusted is combined with the background or scene that has been rendered from the same viewpoint of the person to generate an output image that depicts the person with the background or scene.

In some examples, as the camera viewpoint of the person changes, the background or scene is updated to maintain the illusion that the background or scene is part of the background of the camera used to capture the image of the person. This results in a more realistic AR/VR presentation of an artificial background replacement in an image depicting a person or other object. In this way, the background of an image depicting the person can be seamlessly and realistically replaced with a new background continuously and in real time. This allows the user or person depicted in the image to walk around in three-dimensions (3D) or to change the viewpoint of the camera while the new background continues to be updated to avoid breaking the illusion that the new background is not actually part of the real-world background captured by the camera.

Specifically, the disclosed techniques access an image depicting a person and one or more camera parameters representing a viewpoint associated with a camera used to capture the image. The disclosed techniques extract a portion of the image comprising the depiction of the person. The disclosed techniques process, by a NeRF machine learning model, the one or more camera parameters to render an estimated depiction of a scene from the viewpoint associated with the camera used to capture the image. The disclosed techniques combine the portion of the image comprising the depiction of the person with the estimated depiction of the scene to generate an output image and cause the output image to be presented on a client device.

In this way, the disclosed techniques improve the overall AR functionality and experience of the user in using the electronic device, while also reducing the overall amount of system resources needed to accomplish a task.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications (also referred to as "external applications" and "external apps") 109 using Application Program Interfaces (APIs).

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 (sometimes referred to as a client application) is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections, the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
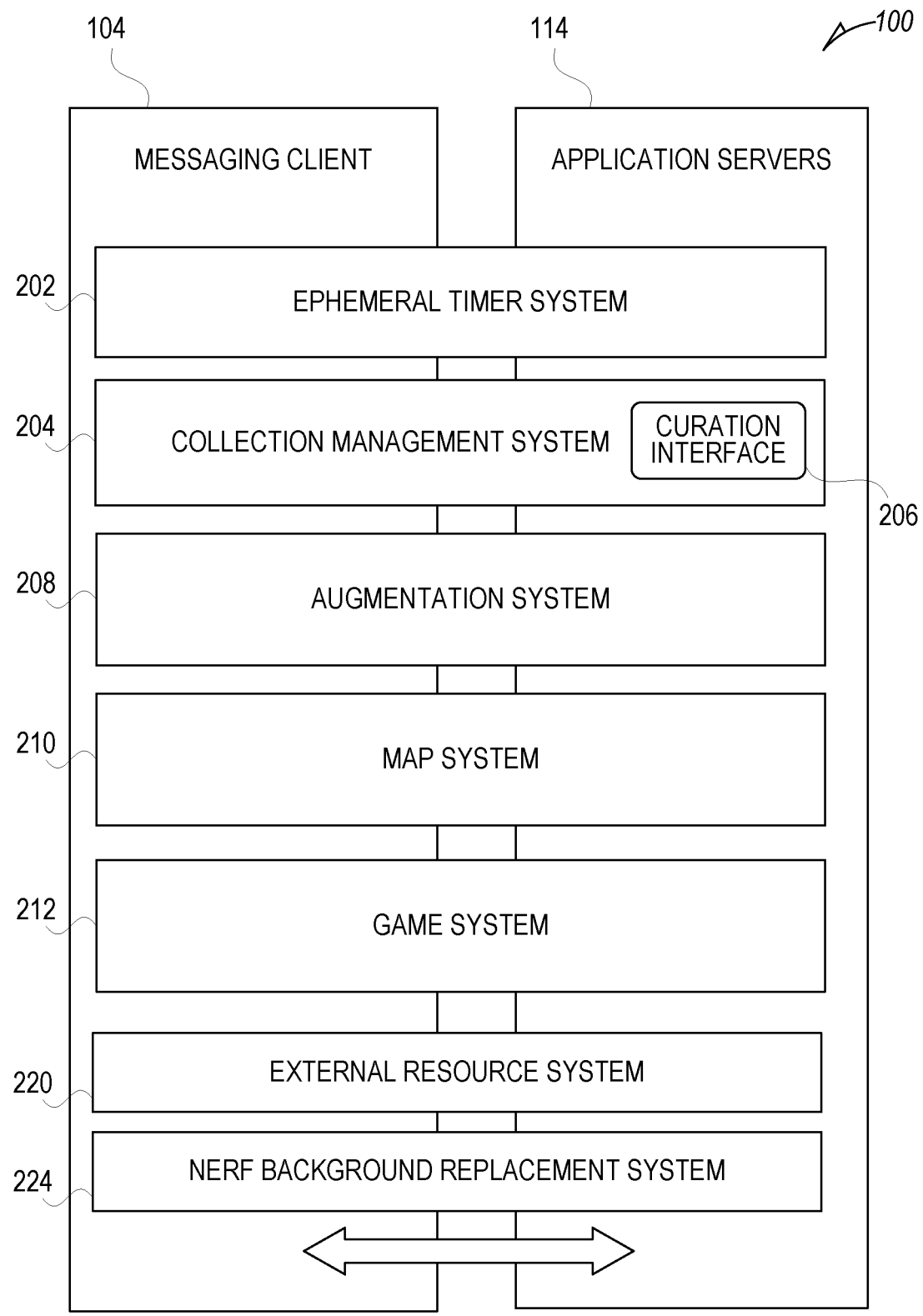
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., launching an AR experience, as discussed in connection with FIGS. 6-10 below).

Figure 3:
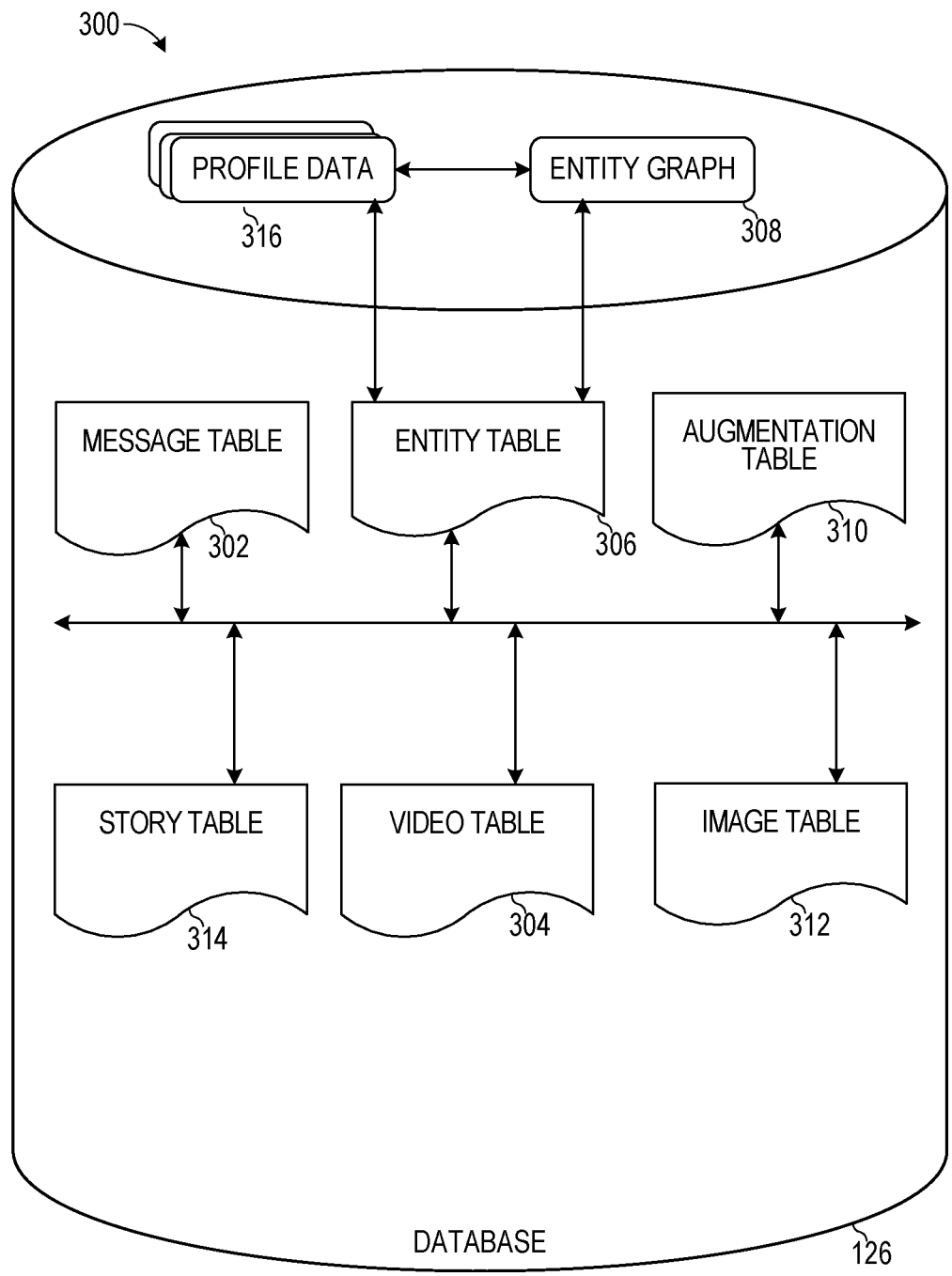
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a. *js file or a .json file) and a style sheet (e.g., a.*ss file).

In response to receiving a user selection of the option to launch or access features of the external resource (e.g., external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

In some examples, the messaging client 104 receives input from a user that selects a virtual or real-world background from a list of available backgrounds. In response to receiving the input, the messaging client 104 retrieves a NeRF machine learning model associated with the selected background. The messaging client 104 accesses or activates a front-facing or rear-facing camera of the client device 102 to begin capturing a real-time video feed or to retrieve a previously captured image or video feed. The messaging client 104 obtains one or more camera parameters from the image or video, such as a height, accelerometer measurement, and/or gyroscopic measurement. The messaging client 104 uses the one or more camera parameters to render a view of the selected background by the NeRF machine learning model. The rendered view is then combined with an extracted object (e.g., person) from the image or video to replace a background of the image or video with the rendered view of the selected background. This results in a realistic display of background replacement in a real-time or previously captured image or video stream.

In some examples, the messaging client 104 applies a relighting machine learning model to the extracted object. The relighting machine learning model adjusts lighting properties of the extracted object to match lighting properties of the rendered background. This further enhances the illusion that the rendered background is actually part of the real-world environment of the object.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and a NeRF background replacement system 224.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, and functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface (GUI) of the messaging client 104 to access features of the web-based external resource, the messaging client 104 obtains the HTML5 file and instantiates the resources necessary to access the features of the web-based external resource.

The messaging client 104 presents a GUI (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another GUI of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

The NeRF background replacement system 224 allows a user to generate a virtual experience (AR or VR) based on images captured in which a background of the image is replaced with an alternate background that is rendered by a NeRF machine learning model. For example, the NeRF background replacement system 224 can access an image depicting a person and one or more camera parameters representing a viewpoint associated with a camera used to capture the image and extract a portion of the image comprising the depiction of the person. The one or more camera parameters comprise at least one of an accelerometer measurement, a gyroscopic measurement, or a height. The NeRF background replacement system 224 processes, by a NeRF machine learning model, the one or more camera parameters to render an estimated depiction of a scene from the viewpoint associated with the camera used to capture the image. The NeRF background replacement system 224 combines the portion of the image comprising the depiction of the person with the estimated depiction of the scene to generate an output image and causes the output image to be presented on a client device 102.

In some examples, the NeRF background replacement system 224 processes the image depicting the person and the estimated depiction of the scene using a relighting machine learning model to adjust lighting properties of the output image. Specifically, the NeRF background replacement system 224 adjusts a set of lighting properties of the extracted portion of the image based on the relighting machine learning model to match lighting properties of the estimated depiction of the scene.

The NeRF background replacement system 224 trains the relighting machine learning model by performing operations including receiving training data comprising a plurality of training image pairs and ground truth images corresponding to the plurality of training image pairs, with each pair in the plurality of training image pairs comprising a first image depicting one or more training objects captured under a first set of lighting conditions and a second image depicting a training scene captured under a second set of lighting conditions. The training operations include applying the relighting machine learning model to a first training image pair of the plurality of training image pairs to estimate an adjustment to lighting properties of the first image of the first training image pair to match the second set of lighting conditions of the second image of the plurality of training image pairs and modifying one or more lighting properties of the first image of the first training image pair based on the estimated adjustment to the lighting properties to generate a lighting adjusted first training image. The training operations include computing a deviation between the lighting adjusted first training image and the ground truth image associated with the first training image pair and updating parameters of the relighting machine learning model based on the computed deviation.

In some examples, the first training image pair and the corresponding ground truth image corresponding to the first training image pair are generated by capturing a training image depicting an object of the one or more training objects under the second set of lighting conditions and extracting the depiction of the object under the second set of lighting conditions from the training image. The first set of lighting conditions are used to artificially modify lighting properties of the extracted depiction of the object to generate the first image of the first training image pair and the second image is generated by removing the depiction of the object from the training image. The depiction of the object under the second set of lighting conditions is stored as the ground truth image corresponding to the first training image pair.

In some examples, the NeRF background replacement system 224 receives input that selects the scene from a plurality of scenes, with each of the plurality of scenes being associated with a respective NeRF machine learning model. The NeRF background replacement system 224 accesses the NeRF machine learning model associated with the scene in response to receiving the input. The NeRF background replacement system 224 extracts the portion of the image by processing the image depicting the person with an object detection machine learning model. The values output by the object detection machine learning model correspond to pixel coordinates of the person depicted in the image. The NeRF background replacement system 224 receives a real-time video feed from the camera, wherein the image is accessed from the real-time video feed. The NeRF background replacement system 224 normalizes the image based on a difference between a camera position used to capture the image and a default height parameter associated with the NeRF machine learning model.

In some examples, the NeRF background replacement system 224 combines the portion of the image including the depiction of the person with the estimated depiction of the scene by concatenating the portion of the image comprising the depiction of the person with the estimated depiction of the scene. In some examples, the NeRF background replacement system 224 trains the NeRF machine learning model by performing operations including receiving training data including ground truth images depicting different projections of a real-world environment comprising the scene. The operations include generating a training set of camera parameters associated with a training viewpoint and processing, by the NeRF machine learning model, the training set of camera parameters to render an estimated depiction of the real-world environment from the training viewpoint. The operations include accessing the ground truth image associated with the training viewpoint and computing a deviation between the estimated depiction of the real-world environment from the training viewpoint and the ground truth image associated with the training viewpoint. The operations include updating parameters of the NeRF machine learning model based on the computed deviation. In some cases, the NeRF background replacement system 224 updates a background, generated by the NeRF machine learning model, depicted in the output image based on changes to the viewpoint in a subsequently received image depicting the person in real time.

The NeRF background replacement system 224 is a component that can be accessed by an AR/VR application implemented on the client device 102. The AR/VR application uses a red, green, blue (RGB) camera to capture an image of a room in a home. The AR/VR application applies various trained machine learning techniques on the captured image or video of the real-world environment to segment items of the real-world environment. The AR/VR application includes a depth sensor to generate depth data. For example, the AR/VR application can maintain a specific real-world object (e.g., a piece of furniture), such as an AR chair or sofa, depicted in the image or video that is captured by the client device 102 to a virtual experience (e.g., an AR experience) corresponding to a different real-world environment that was previously captured at a different location. In some implementations, the AR/VR application continuously captures images of the real-world environment in real time or periodically to continuously or periodically update the locations of the real-world object within a view of the virtual experience. This allows the user to move around in the real world and see how the real-world objects looks in different areas of the virtual experience in real time.

An illustrative implementation of the NeRF background replacement system 224 is shown and described in connection with FIG. 5 below.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The GUI, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping or selecting the individual face or a series of individual faces displayed within the GUI.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can also store training data for training one or more machine learning techniques (models) to detect and extract real-world objects or items of real-world environment depicted in an image; to render a 3D scene from a viewpoint associated with one or more camera parameters of an image or video; and/or to relight a portion of an object extracted from an image to match lighting conditions of the rendered 3D scene. Specifically, the training data can be used to train machine learning models that implement one or more of an object detection module 512 (FIG. 5), a scene generation module 514, and/or a relighting module 516. The object detection module 512 is trained to establish a relationship between one or more object segmentations and ground-truth object segmentations (or matting). The object segmentations or matting output by the object detection module 512 provide values in a range between 0 and 1 indicating a likelihood that a pixel in an image is part of the object or not. Based on the values, the object detection module 512 can be used to extract those portions of the image that have values above a certain threshold. The scene generation module 514 is trained to establish a relationship between one or more camera parameters and a ground truth viewpoint of a 3D scene. The relighting module 516 is trained to establish a relationship between a portion of an image under a first set of lighting conditions and ground truth lighting conditions of the portion under a second set of lighting conditions.

In some examples, the training data can include a plurality of training image pairs and ground truth images corresponding to the plurality of training image pairs, each pair in the plurality of training image pairs including a first image depicting one or more training objects captured under a first set of lighting conditions and a second image depicting a training scene captured under a second set of lighting conditions. The training data can be generated by capturing a training image depicting an object of the one or more training objects under the second set of lighting conditions; extracting the depiction of the object under the second set of lighting conditions from the training image; using the first set of lighting conditions to artificially modify lighting properties of the extracted depiction of the object to generate the first image of the first training image pair; generating the second image by removing the depiction of the object from the training image; and storing the depiction of the object under the second set of lighting conditions as the ground truth image corresponding to the first training image pair.

In some examples, the training data can include ground truth images depicting different projections of a real-world environment including a given 3D scene.

Data Communications Architecture

Figure 4:
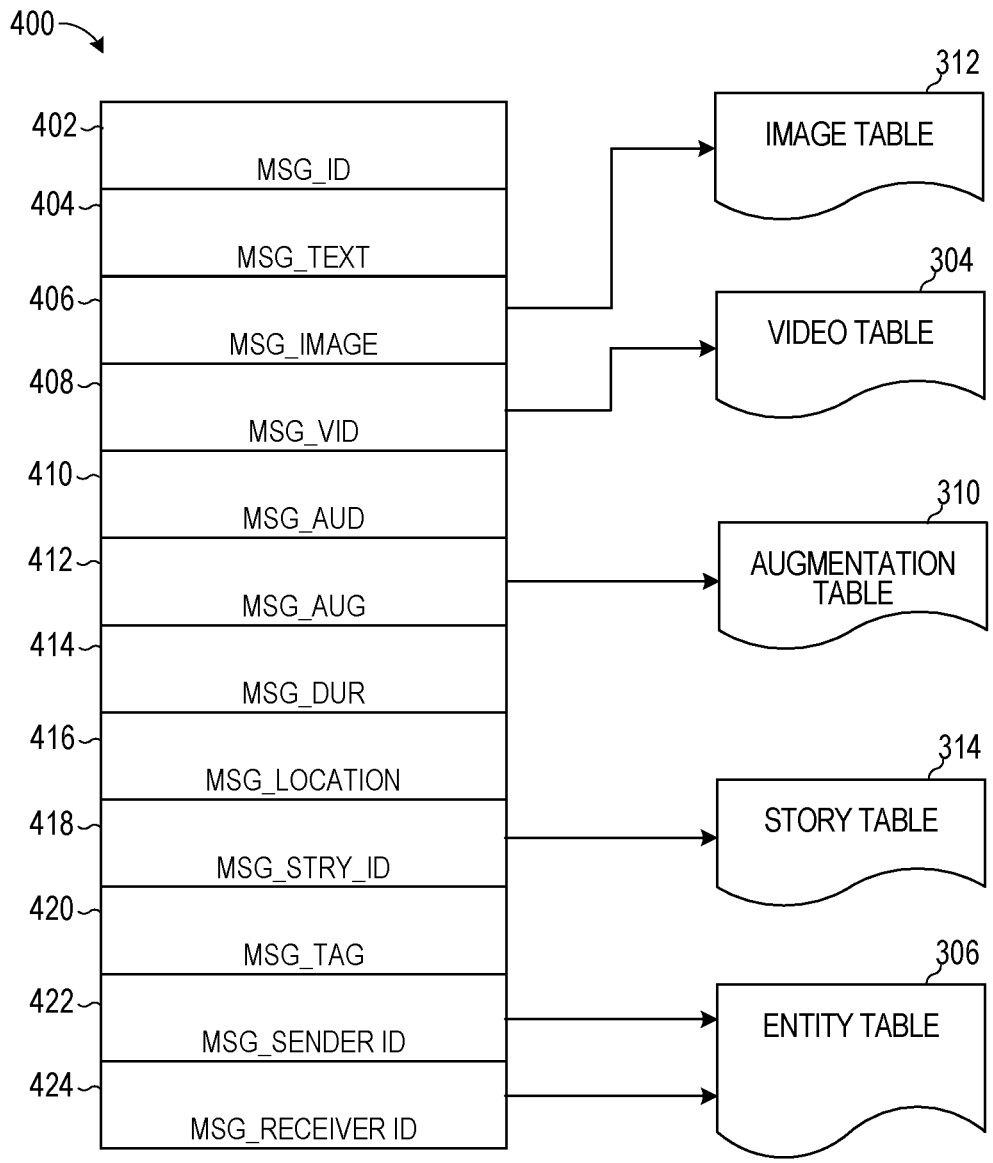
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

NeRF Background Replacement System

Figure 5:
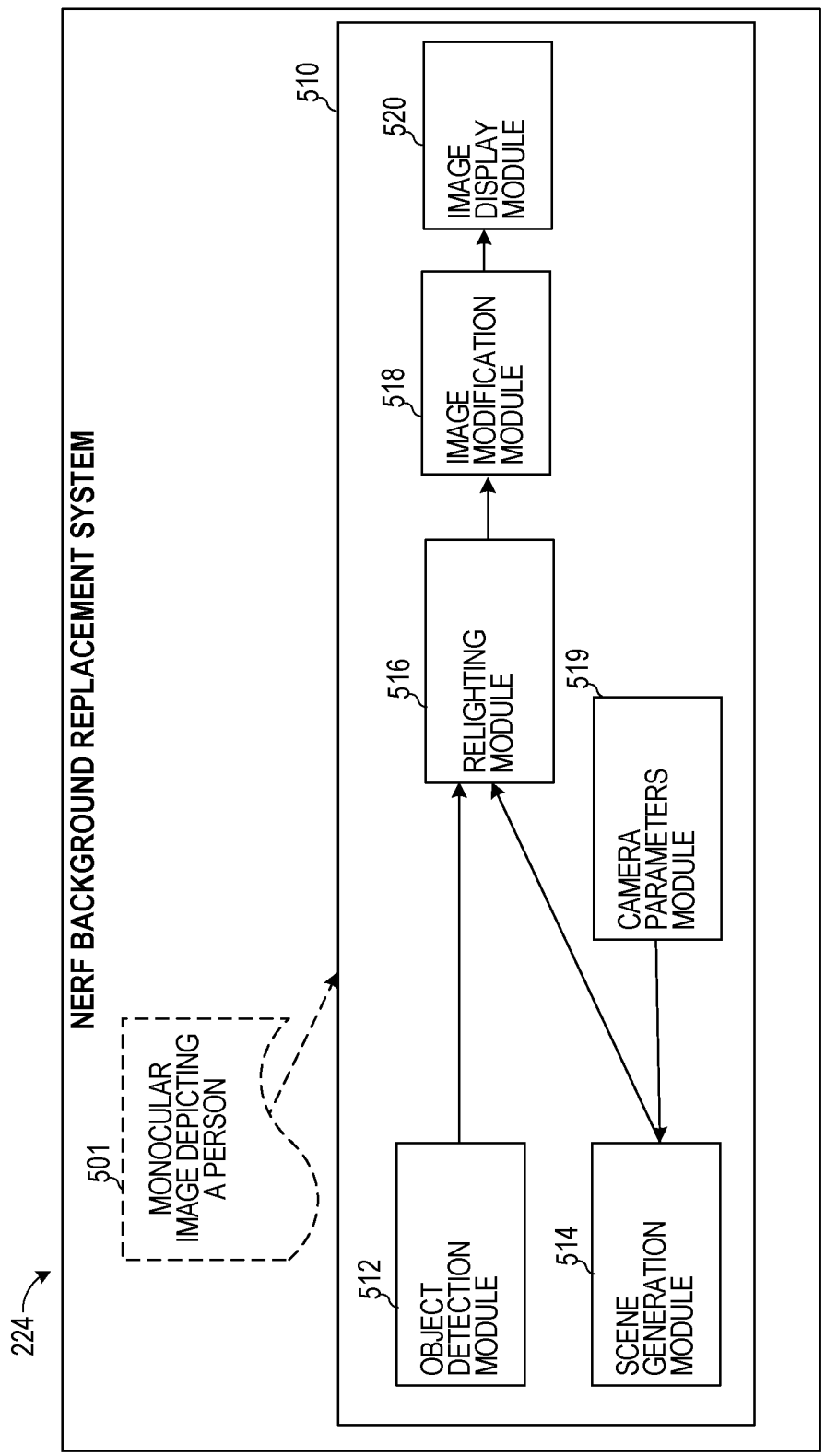
FIG. 5 is a block diagram showing an example NeRF background replacement system, according to some examples.

FIG. 5 is a block diagram showing an example NeRF background replacement system 224, according to example examples. The NeRF background replacement system 224 includes a set of components 510 that operate on a set of input data (e.g., a monocular image (or video)) depicting a person (object) in a real-world environment 501. The NeRF background replacement system 224 creates a photorealistic image or video of a person or object in a different prerecorded scene or background.

The NeRF background replacement system 224 includes the object detection module 512, the scene generation module 514, a camera parameters module 519, the relighting module 516, an image modification module 518, and an image display module 520. All or some of the components of the NeRF background replacement system 224 can be implemented by a server, in which case, the monocular image depicting a person in a real-world environment 501 is provided to the server by the client device 102. In some cases, some or all of the components of the NeRF background replacement system 224 can be implemented by the client device 102 or can be distributed across a set of client devices 102 and one or more servers.

The NeRF background replacement system 224 allows a user to generate one or more AR or VR experiences that depict a user or object extracted from an image having a first background with a different second background. The camera used to capture the image can be moved around in 3D and in real time and a viewpoint of the rendered background of the AR or VR experience is updated to preserve the illusion that the background is part of the image captured by the camera of the client device 102. For example, the NeRF background replacement system 224 can receive input from a user that selects a new background from a list of available backgrounds. Once the background selection is received, the NeRF background replacement system 224 activates a camera to begin capturing images of the real-world environment in which the user is currently present. The NeRF background replacement system 224 automatically replaces portions of the background of the real-world environment with a rendered viewpoint of the new background selected from the list.

Figure 6:
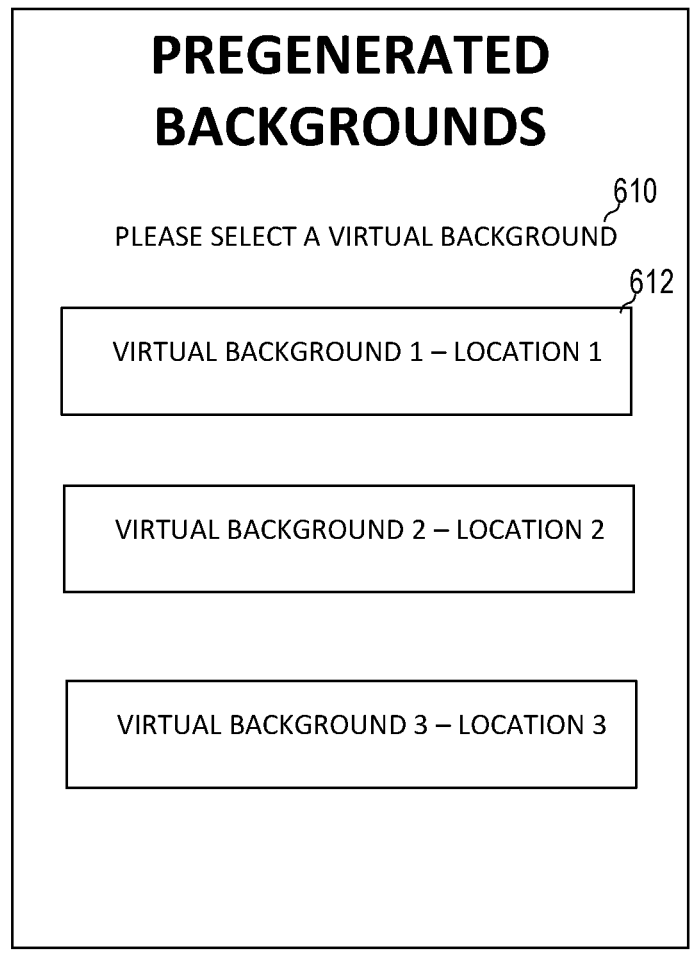
FIGS. 6-9 are diagrammatic representations of outputs of the NeRF background replacement system, in accordance with some examples.

For example, as shown in FIG. 6, a user interface 600 is presented on the client device 102 in which a list of available virtual backgrounds 610 are presented. A user input is received by the client device 102 that selects a first virtual or real-world background 612. In response, the NeRF background replacement system 224 accesses the NeRF machine learning model associated with the first virtual or real-world background 612 and generates or renders a viewpoint of the first virtual or real-world background 612 based on camera parameters used to capture a real-time or previously recorded image or video depicting an object (e.g., a person).

Specifically, the object detection module 512 receives a monocular image (or video) depicting an object in a real-world environment 501. This image or video can be received as part of a real-time video stream, a previously captured video stream, or a new image captured by a front-facing or rear-facing camera of the client device 102. The object detection module 512 applies one or more machine learning techniques to identify real-world physical objects that appear in the monocular image depicting an object in a real-world environment 501. For example, the object detection module 512 generates a segmentation that identifies portions of the image corresponding to the object (e.g., the person). In an example, the object detection module 512 outputs a range of values between 0 and 1 indicating whether a pixel belongs to the object or not. The object detection module 512, based on the values, crops out or extracts portions of the image corresponding to the object. For example, the object detection module 512 can remove any portion of the image that is associated with a value below a certain threshold. Any type of object that can appear or be present in a particular real-world environment can be recognized and extracted by the object detection module 512.

In some examples, during training, the machine learning technique of the object detection module 512 receives a given training image (e.g., a monocular image or video depicting a real-world environment, such as an image of a living room or bedroom) from training image data stored in data structures 300. The machine learning technique (e.g., neural network or other machine learning model) is applied to the given training image. The machine learning technique extracts one or more features from the given training image to estimate object segmentations of real-world environment objects depicted in the image or video. For example, the machine learning technique obtains the given training image depicting a real-world environment and extracts features from the image that correspond to the real-world objects that appear in the real-world environment.

The machine learning technique obtains known or predetermined ground-truth segmentations of the real-world items depicted in the real-world environment from the training data. The machine learning technique compares (computes a deviation between) the estimated segmentations with the ground truth segmentations. Based on a difference threshold of the comparison (or deviation), the machine learning technique updates one or more coefficients or parameters and obtains one or more additional training images of a real-world environment. After a specified number of epochs or batches of training images have been processed and/or when a difference threshold (or deviation) (computed as a function of a difference or deviation between the estimated segmentations and the ground-truth segmentations) reaches a specified value, the machine learning technique completes training and the parameters and coefficients of the machine learning technique are stored as a trained machine learning technique.

Figure 7:

In an example, after training, the machine learning technique is implemented as part of the object detection module 512 and receives a monocular input image depicting an object in a real-world environment 501 as a single RGB image from a client device 102 or as a video of multiple images. The machine learning technique applies the trained machine learning technique(s) to the received input image to generate a prediction or estimation of segmentations of the real-world items or objects depicted in the monocular image and extract such objects from the images for use in background replacement. For example, as shown in FIG. 7, an image 700 is received from a real-time video feed or a previously recorded video feed and an object 712 is extracted from the image 700.

In some examples, together with capturing an image or video from a camera of the client device 102, the NeRF background replacement system 224 captures one or more camera parameters. The camera parameters include depth sensor information, such as LiDAR sensor data, height information, accelerometer measurements, and/or gyroscopic measurements.

The camera parameters module 519 of the NeRF background replacement system 224 provides the one or more camera parameters of a real-time video or previously captured video to the scene generation module 514. The scene generation module 514 is trained to generate or render a viewpoint of a given 3D scene based on the one or more camera parameters associated with a new image. Specifically, the scene generation module 514 implements a NeRF machine learning model that is trained based on a set of training data to render a given scene from a viewpoint. In some examples, to train the NeRF machine learning model, the scene generation module 514 obtains a set of training data.

During training, the scene generation module 514 receives training data including ground truth images depicting different projections of a real-world environment corresponding to a particular scene. The training data is generated by capturing a collection of images of a real-world environment (e.g., the particular scene). The scene generation module 514 together with the camera parameters module 519 generates a training set of camera parameters associated with a training viewpoint. For example, the scene generation module 514 receives a random set of camera parameters from the camera parameters module 519 corresponding to the training viewpoint. The scene generation module 514 processes, by the NeRF machine learning model, the training set of camera parameters to render an estimated depiction of the real-world environment from the training viewpoint.

The NeRF machine learning model (e.g., neural network) accesses the ground truth image associated with the training viewpoint from the training data. The NeRF machine learning model compares (computes a deviation between) the estimated depiction of the real-world environment from the training viewpoint and the ground truth image associated with the training viewpoint. Based on a difference threshold of the comparison (or deviation), the NeRF machine learning model updates one or more coefficients or parameters and obtains one or more additional training images of the scene. After a specified number of epochs or batches of training images have been processed and/or when a difference threshold (or deviation) reaches a specified value, the NeRF machine learning model completes training and the parameters and coefficients of the NeRF machine learning model are stored as a trained NeRF machine learning model.

Figure 8:
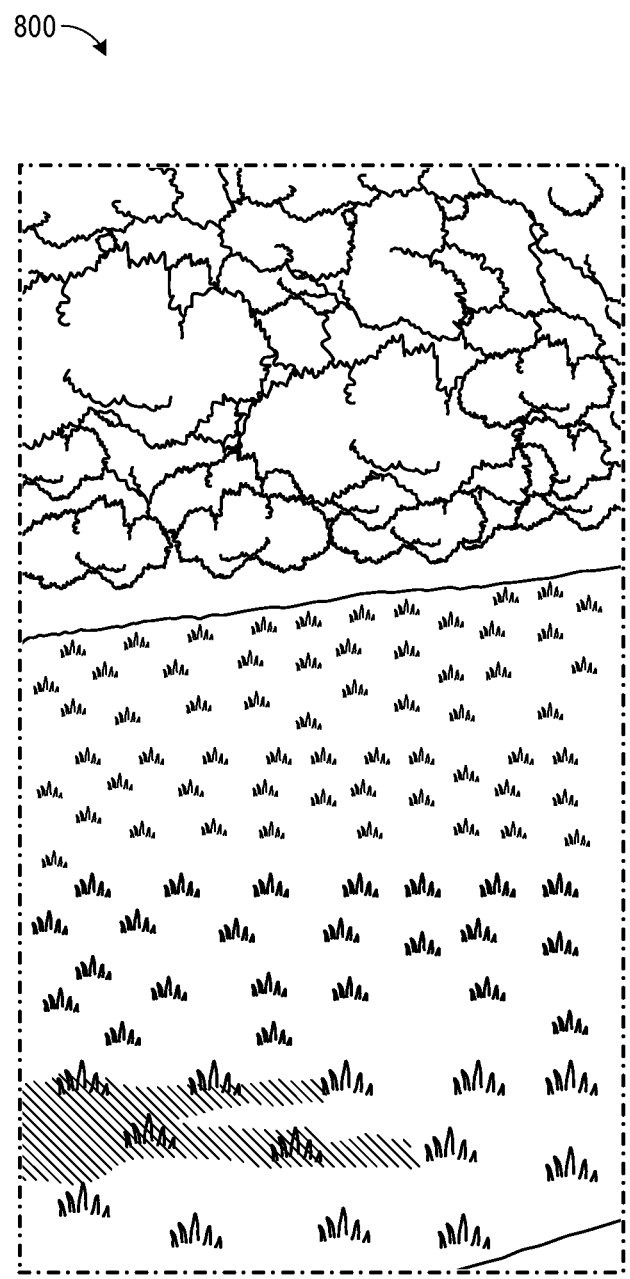

Once trained, the NeRF machine learning model, implemented as part of the scene generation module 514, receives a new set of camera parameters (e.g., from a real-time video feed or previously recorded video feed) from the camera parameters module 519. The NeRF machine learning model generates or renders a view of the same scene it was trained on but from the new set of camera parameters corresponding to the new viewpoint of the real-time video feed or previously recorded video feed. For example, as shown in FIG. 8, a 3D scene 800 is rendered from the same viewpoint as the viewpoint used to capture the image 700 from which the object 712 was extracted.

Figure 9:

In some examples, the outputs of the object detection module 512 and the scene generation module 514 are provided to the relighting module 516. The relighting module 516 combines (e.g., concatenates) the portion of the image including the depiction of the person with the estimated depiction of the scene to generate an output image. For example, the relighting module 516 combines the extracted portion of the real-time or previously recorded image or video (corresponding to a particular viewpoint) with a viewpoint of the scene corresponding to the particular viewpoint rendered by the scene generation module 514. In some examples, the relighting module 516, as part of combining the two images, adjusts lighting properties or parameters of the extracted portion of the real-time or previously recorded image or video to match lighting conditions or properties of the rendered 3D scene. For example, as shown in FIG. 9, the relighting module 516 generates a combined image 900 in which the object 920 (extracted as the object 712 from the image 700) is combined with the scene 910 (e.g., the viewpoint of the 3D scene 800). The relighting module 516 can adjust the lighting conditions of the object 712 to present the object 712 as the lighting adjusted object 920 in the image 900 to match the lighting conditions of the 3D scene 800. As the camera is moved around to capture the object 712 from a new viewpoint, the 3D scene 800 is regenerated based on new camera parameters and the resulting combined image 900 is updated to present the object 920 and the scene 910 from a different viewpoint corresponding to the new viewpoint.

In some examples, the relighting module 516 processes the image depicting the person (captured by the camera of the client device 102) and the estimated depiction of the scene by a relighting machine learning model to adjust lighting properties of the combined image. The relighting module 516 adjusts a set of lighting properties of the extracted portion of the image based on the relighting machine learning model to match lighting properties of the estimated depiction of the scene. In this way, the lighting properties of the two images obtained by different cameras, at different times, and under different lighting conditions, are combined to form a unified image that has all the same lighting conditions and camera views.

The relighting machine learning model is trained by accessing a set of training data. For example, during training, the relighting module 516 receives training data including a plurality of training image pairs and ground truth images corresponding to the plurality of training image pairs, each pair in the plurality of training image pairs comprising a first image depicting one or more training objects captured under a first set of lighting conditions and a second image depicting a training scene captured under a second set of lighting conditions. In some examples, the training data is generated artificially. For example, a collection of images can be captured that depict an object in a particular real-world environment. The collection of images can be processed to extract the object leaving behind only the background of the collection of images. The collection of images that include the object and the background (which are the ground truth images) can be artificially modified to adjust the lighting conditions that appear in the collection of images. This results in two sets of images in the training data, a first set of images that depict only a background with a first set of lighting conditions and a second set of images that depict the background and object under a second set of lighting conditions. Respective images from the two sets of images form a pair of images and the ground truth image associated with the pair of images is the corresponding image from the collection of images in which the lighting conditions have not been modified.

The relighting machine learning model (e.g., neural network) is trained to adjust the second set of lighting conditions to match the first set of lighting conditions. To do so, the relighting machine learning model is applied to a first training image pair of the plurality of training image pairs to estimate an adjustment to lighting properties of the first image of the first training image pair to match the second set of lighting conditions of the second image of the plurality of training image pairs. One or more lighting properties of the first image of the first training image pair are modified based on the estimated adjustment to the lighting properties to generate a lighting adjusted first training image. The relighting machine learning model computes a deviation between the lighting adjusted first training image and the ground truth image associated with the first training image pair.

Based on a difference threshold of the comparison (or deviation), the relighting machine learning model updates one or more coefficients or parameters and obtains one or more additional training images. After a specified number of epochs or batches of training images have been processed and/or when a difference threshold (or deviation) reaches a specified value, the relighting machine learning model completes training, and the parameters and coefficients of the relighting machine learning model are stored as a trained relighting machine learning model of the relighting module 516.

The relighting module 516 communicates the combined image of the extracted object with the rendered 3D scene to the image modification module 518. The image modification module 518 can perform additional modifications, such as adding one or more virtual objects or AR elements to the combined image. Then, the image modification module 518 overlays the virtual objects over the combined image. The image modification module 518 communicates the modified image to the image display module 520. The image display module 520 presents the modified image on the client device 102.

Figure 10:
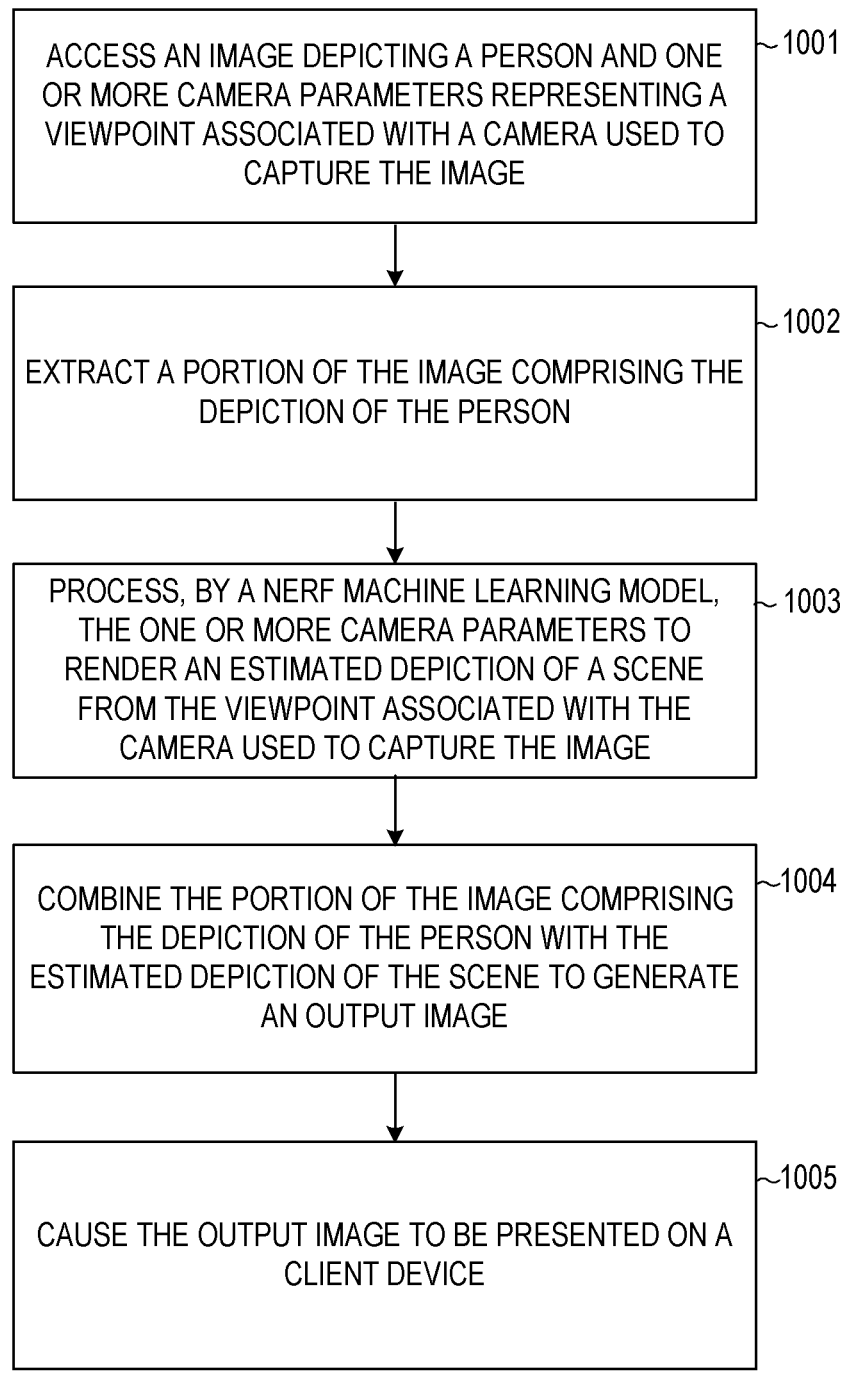
FIG. 10 is a flowchart illustrating example operations of the NeRF background replacement system, according to some examples.

FIG. 10 is a flowchart of a process 1000, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, a client device 102 (and/or server) accesses an image depicting a person and one or more camera parameters representing a viewpoint associated with a camera used to capture the image, as discussed above.

At operation 1002, the client device 102 (and/or server) extracts a portion of the image comprising the depiction of the person, as discussed above.

At operation 1003, the client device 102 (and/or server) processes, by a NeRF machine learning model, the one or more camera parameters to render an estimated depiction of a scene from the viewpoint associated with the camera used to capture the image, as discussed above.

At operation 1004, the client device 102 (and/or server) combines the portion of the image comprising the depiction of the person with the estimated depiction of the scene to generate an output image, as discussed above.

At operation 1005, the client device 102 (and/or server) causes the output image to be presented on a client device, as discussed above.

Machine Architecture

Figure 11:
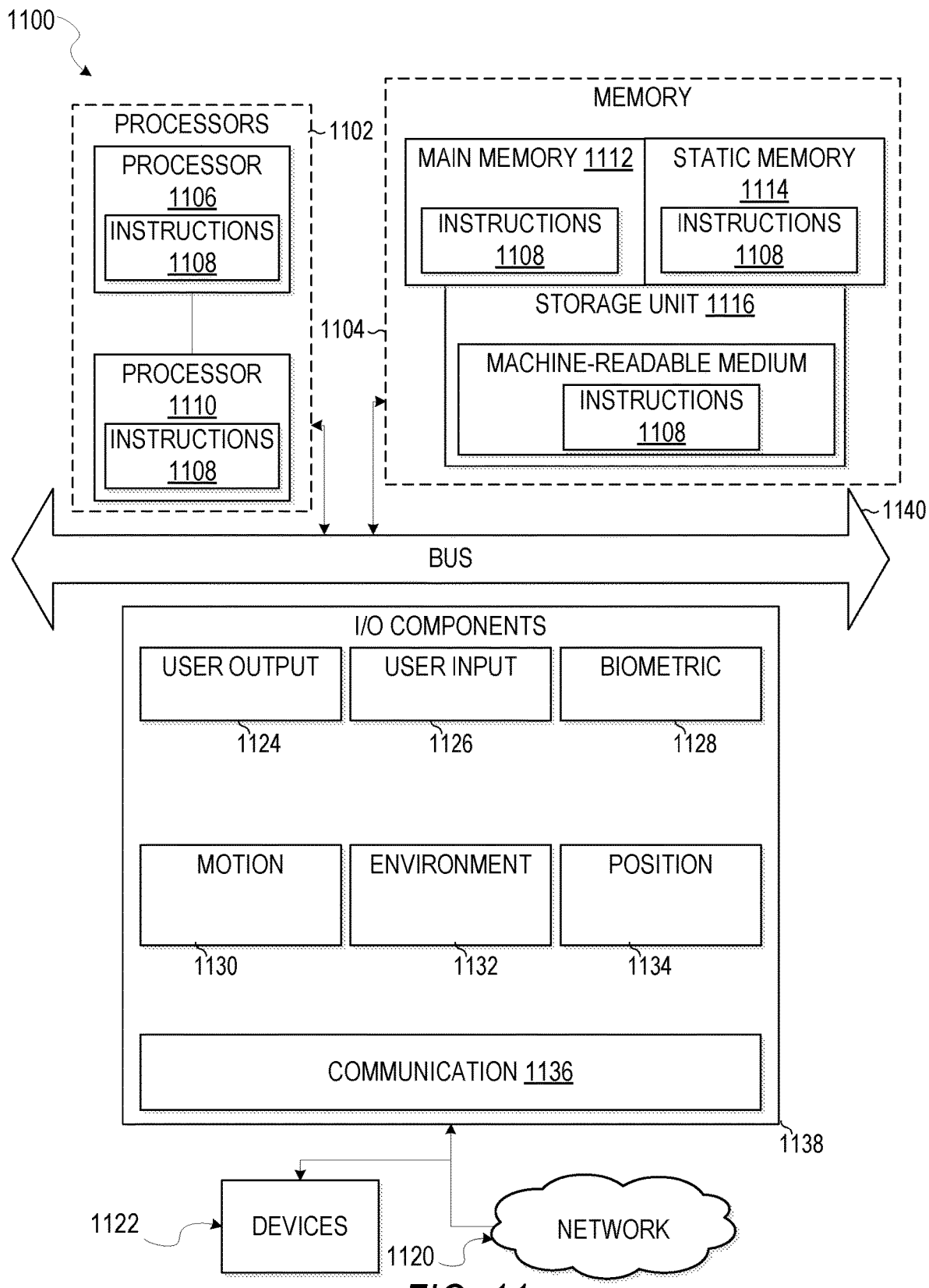
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within a machine-readable medium within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, and rotation sensor components (e.g., gyroscope).

The environmental components 1132 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., HTTP). Similarly, the instructions 1108 may be transmitted or received using a transmission medium via a coupling (e.g., a peer-to-peer coupling) to the devices 1122.

Software Architecture

Figure 12:
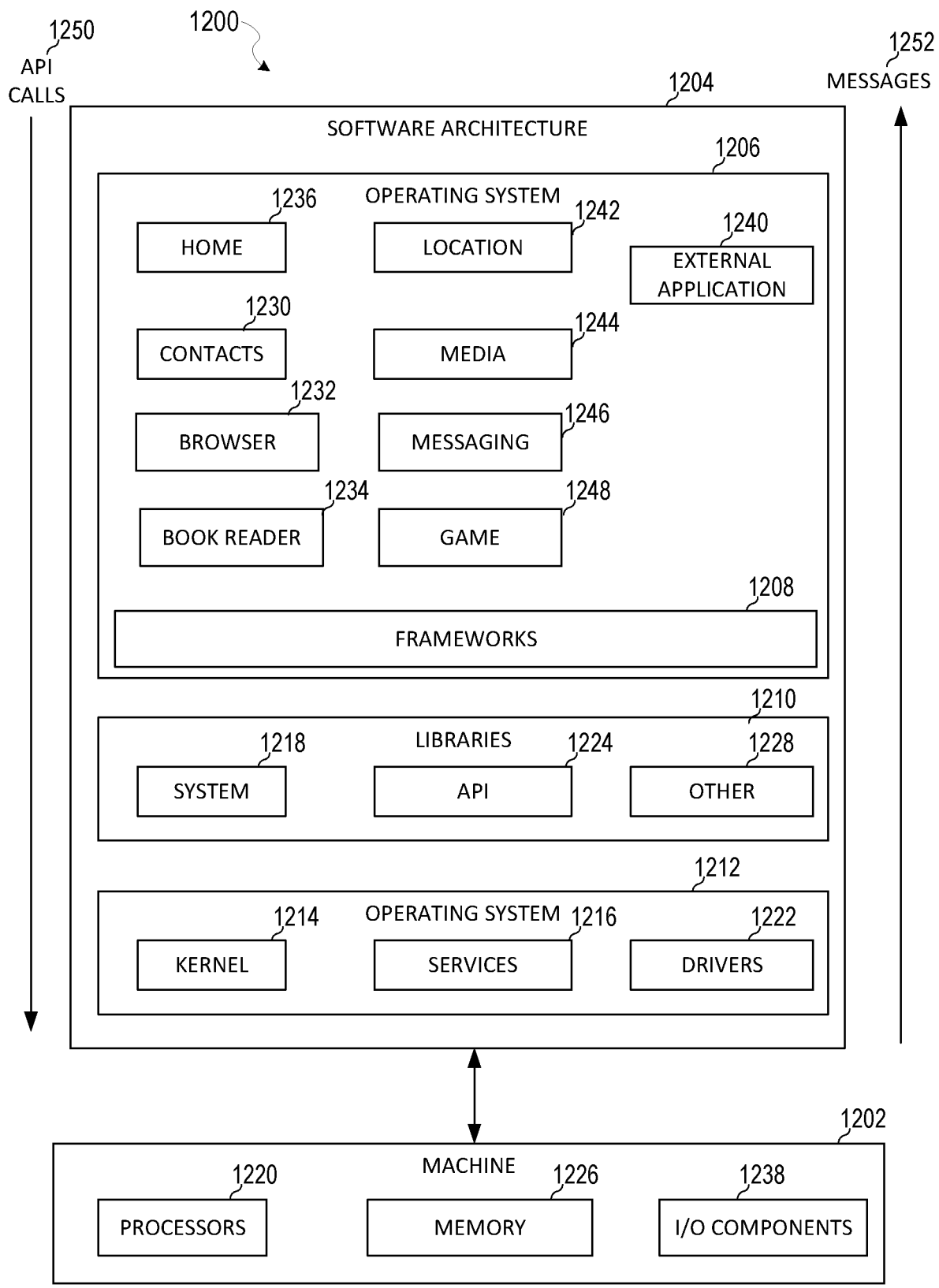
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various GUI functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as an external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
accessing, by one or more processors, an image depicting a person and one or more camera parameters representing a viewpoint associated with a camera used to capture the image;
extracting a portion of the image comprising the depiction of the person;
processing, by a neural radiance field (NeRF) machine learning model, the one or more camera parameters to render an estimated depiction of a scene from the viewpoint associated with the camera used to capture the image, the NeRF machine learning model trained by performing training operations comprising:
generating a training set of camera parameters associated with a training viewpoint;
processing, by the NeRF machine learning model, the training set of camera parameters to render an estimated depiction of a real-world environment from the training viewpoint; and
computing a deviation between the estimated depiction of the real-world environment comprising the scene from the training viewpoint and a ground truth image associated with the training viewpoint;
combining the portion of the image comprising the depiction of the person with the estimated depiction of the scene to generate an output image; and
causing the output image to be presented on a user device.

2. The method of claim 1, wherein the image is accessed by a messaging application implemented on the user device.

3. The method of claim 1, further comprising:
processing the image depicting the person and the estimated depiction of the scene by a relighting machine learning model to adjust lighting properties of the output image.

4. The method of claim 3, further comprising:
adjusting a set of lighting properties of the extracted portion of the image based on the relighting machine learning model to match lighting properties of the estimated depiction of the scene.

5. The method of claim 3, further wherein the relighting machine learning model is trained by performing operations comprising:
receiving training data comprising a plurality of training image pairs and ground truth images corresponding to the plurality of training image pairs, each pair in the plurality of training image pairs comprising a first image depicting one or more training objects captured under a first set of lighting conditions and a second image depicting a training scene captured under a second set of lighting conditions;
applying the relighting machine learning model to a first training image pair of the plurality of training image pairs to estimate an adjustment to lighting properties of the first image of the first training image pair to match the second set of lighting conditions of the second image of the plurality of training image pairs;
modifying one or more lighting properties of the first image of the first training image pair based on the estimated adjustment to the lighting properties to generate a lighting adjusted first training image;
computing a deviation between the lighting adjusted first training image and the ground truth image associated with the first training image pair; and
updating parameters of the relighting machine learning model based on the computed deviation.

6. The method of claim 5, further comprising generating the first training image pair and the corresponding ground truth image corresponding to the first training image pair by:
capturing a training image depicting an object of the one or more training objects under the second set of lighting conditions;
extracting the depiction of the object under the second set of lighting conditions from the training image;
using the first set of lighting conditions to artificially modify lighting properties of the extracted depiction of the object to generate the first image of the first training image pair;
generating the second image by removing the depiction of the object from the training image; and
storing the depiction of the object under the second set of lighting conditions as the ground truth image corresponding to the first training image pair.

7. The method of claim 1, wherein the one or more camera parameters comprise at least one of an accelerometer measurement, a gyroscopic measurement, or a height.

8. The method of claim 1, further comprising:
receiving input that selects the scene from a plurality of scenes, each of the plurality of scenes being associated with a respective NeRF machine learning model; and
accessing the NeRF machine learning model associated with the scene in response to receiving the input.

9. The method of claim 1, wherein extracting the portion of the image comprises processing the image depicting the person with an object detection machine learning model.

10. The method of claim 9, wherein values output by the object detection machine learning model correspond to pixel coordinates of the person depicted in the image.

11. The method of claim 1, further comprising receiving a real-time video feed from the camera, wherein the image is accessed from the real-time video feed.

12. The method of claim 1, further comprising:
normalizing the image based on a difference between a camera position used to capture the image and a default height parameter associated with the NeRF machine learning model.

13. The method of claim 1, wherein combining the portion of the image comprising the depiction of the person with the estimated depiction of the scene comprises concatenating the portion of the image comprising the depiction of the person with the estimated depiction of the scene.

14. The method of claim 1, wherein the NeRF machine learning model is trained by performing operations comprising:
receiving training data comprising ground truth images depicting different projections of the real-world environment comprising the scene; and
updating parameters of the NeRF machine learning model based on the computed deviation.

15. The method of claim 1, further comprising updating a background, generated by the NeRF machine learning model, depicted in the output image based on changes to the viewpoint in a subsequently received image depicting the person in real time.

16. A system comprising:
at least one processor configured to perform operations comprising:
accessing an image depicting a person and one or more camera parameters representing a viewpoint associated with a camera used to capture the image;
extracting a portion of the image comprising the depiction of the person;
processing, by a neural radiance field (NeRF) machine learning model, the one or more camera parameters to render an estimated depiction of a scene from the viewpoint associated with the camera used to capture the image, the NeRF machine learning model trained by performing training operations comprising:
generating a training set of camera parameters associated with a training viewpoint;
processing, by the NeRF machine learning model, the training set of camera parameters to render an estimated depiction of a real-world environment from the training viewpoint; and
computing a deviation between the estimated depiction of the real-world environment comprising the scene from the training viewpoint and a ground truth image associated with the training viewpoint;
combining the portion of the image comprising the depiction of the person with the estimated depiction of the scene to generate an output image; and
causing the output image to be presented on a user device.

17. The system of claim 16, wherein the image is accessed by a messaging application implemented on the user device.

18. The system of claim 16, the operations further comprising:
processing the image depicting the person and the estimated depiction of the scene by a relighting machine learning model to adjust lighting properties of the output image.

19. The system of claim 18, the operations further comprising:
adjusting a set of lighting properties of the extracted portion of the image based on the relighting machine learning model to match lighting properties of the estimated depiction of the scene.

20. A non-transitory machine-readable storage medium that includes instructions that, when executed by one or more processors of a machine, cause the machine to perform operations comprising:
accessing an image depicting a person and one or more camera parameters representing a viewpoint associated with a camera used to capture the image;
extracting a portion of the image comprising the depiction of the person;
processing, by a neural radiance field (NeRF) machine learning model, the one or more camera parameters to render an estimated depiction of a scene from the viewpoint associated with the camera used to capture the image, the NeRF machine learning model trained by performing training operations comprising:
generating a training set of camera parameters associated with a training viewpoint;
processing, by the NeRF machine learning model, the training set of camera parameters to render an estimated depiction of a real-world environment from the training viewpoint; and
computing a deviation between the estimated depiction of the real-world environment comprising the scene from the training viewpoint and a ground truth image associated with the training viewpoint;
combining the portion of the image comprising the depiction of the person with the estimated depiction of the scene to generate an output image; and
causing the output image to be presented on a user device.

* * * * *

UNITED STATES PATENT AND TRADEMARK OFFICE
CERTIFICATE OF CORRECTION

| | | |
|---|---|---|
| PATENT NO. | : 12,177,600 B2 | Page 1 of 1 |
| APPLICATION NO. | : 17/852919 | |
| DATED | : December 24, 2024 | |
| INVENTOR(S) | : Assouline et al. | |

It is certified that error appears in the above-identified patent and that said Letters Patent is hereby corrected as shown below:

In the Claims

In Column 35, Line 16, in Claim 14, after "scene;", delete a linebreak

Signed and Sealed this
Thirtieth Day of September, 2025

John A. Squires
*Director of the United States Patent and Trademark Office*